(12) United States Patent
Jung et al.

(10) Patent No.: US 10,243,693 B2
(45) Date of Patent: Mar. 26, 2019

(54) OPTICAL TRANSCEIVER USING FEC, OPTICAL TRANSCEIVING SYSTEM COMPRISING SAME, AND REMOTE OPTICAL WAVELENGTH CONTROL METHOD

(71) Applicant: LIGHTRON FIBER-OPTIC DEVICES INC., Daejeon (KR)

(72) Inventors: Kang-Yong Jung, Daejeon (KR); Jeong-Hwan Cho, Sejong-si (KR); Soo Yuk, Daejeon (KR); Young Jae Nam, Daejeon (KR)

(73) Assignee: LIGHTHORN FIBER-OPTIC DEVICES INC., Daejeon (KR)

( * ) Notice: Subject to any disclaimer, the term of this patent is extended or adjusted under 35 U.S.C. 154(b) by 0 days.

(21) Appl. No.: 15/534,461

(22) PCT Filed: Dec. 11, 2015

(86) PCT No.: PCT/KR2015/013590
§ 371 (c)(1),
(2) Date: Jun. 8, 2017

(87) PCT Pub. No.: WO2016/093657
PCT Pub. Date: Jun. 16, 2016

(65) Prior Publication Data
US 2017/0353268 A1    Dec. 7, 2017

(30) Foreign Application Priority Data

Dec. 12, 2014  (KR) .................. 10-2014-0179129

(51) Int. Cl.
*H04L 1/00* (2006.01)
*H04B 10/50* (2013.01)
(Continued)

(52) U.S. Cl.
CPC ........... *H04L 1/0041* (2013.01); *H04B 10/07* (2013.01); *H04B 10/0779* (2013.01);
(Continued)

(58) Field of Classification Search
None
See application file for complete search history.

(56) References Cited

U.S. PATENT DOCUMENTS

2003/0172336 A1 * 9/2003 Sweeney ............... H03M 13/00
714/758
2006/0198634 A1 * 9/2006 Ofalt .................... H04B 10/077
398/16
(Continued)

FOREIGN PATENT DOCUMENTS

JP    2010263555 A    11/2010
JP    2011077686 A    4/2011
(Continued)

OTHER PUBLICATIONS

ISA Korean Intellectual Property Office, International Search Report Issued in Application No. PCT/KR2015/013590, dated Mar. 16, 2016, WIPO, 4 pages.

*Primary Examiner* — Justin R Knapp
(74) *Attorney, Agent, or Firm* — McCoy Russell LLP

(57) ABSTRACT

The present invention relates to an optical transceiver using FEC, an optical transceiving system comprising the same, and a remote optical wavelength control method and, specifically, to an optical transceiver using FEC, the optical transceiver comprising: a laser diode driver (LDD) for driving a laser diode (LD) for outputting light; a transmitter optical sub-assembly (TOSA) for transmitting an optical signal received from the LD driver; a receiver optical sub-assembly (ROSA) for receiving the optical signal from the transmitter optical sub-assembly; a micro controller unit (MCU) for controlling the transmitter optical sub-assembly
(Continued)

and the receiver optical sub-assembly and analyzing the optical signal; and a forward error correction (FEC) which is controlled by the micro controller unit and generates the optical signal by including, in an overhead excess data frame, control or monitoring request information of a subscriber-side base station.

3 Claims, 4 Drawing Sheets

(51) Int. Cl.
*H04B 10/40* (2013.01)
*H04J 14/02* (2006.01)
*H04B 10/07* (2013.01)
*H04B 10/077* (2013.01)
*H04B 10/572* (2013.01)

(52) U.S. Cl.
CPC .......... *H04B 10/40* (2013.01); *H04B 10/503* (2013.01); *H04B 10/572* (2013.01); *H04J 14/02* (2013.01); *H04L 1/0045* (2013.01)

(56) References Cited

U.S. PATENT DOCUMENTS

| | | | | |
|---|---|---|---|---|
| 2014/0233944 | A1* | 8/2014 | Vetter | H04J 14/0256 398/34 |
| 2015/0037035 | A1* | 2/2015 | Sugawa | H04J 14/08 398/66 |
| 2015/0334004 | A1* | 11/2015 | Hussain | H04L 1/0042 398/5 |
| 2015/0365177 | A1* | 12/2015 | Blumenthal | H04B 10/40 398/9 |
| 2017/0041067 | A1* | 2/2017 | Goto | H04B 10/075 |
| 2017/0207876 | A1* | 7/2017 | Gao | H04J 14/0232 |
| 2018/0091251 | A1* | 3/2018 | Hanneman, Jr. | H04J 14/0256 |

FOREIGN PATENT DOCUMENTS

| | | |
|---|---|---|
| KR | 1020030053678 A | 7/2003 |
| KR | 101230590 B1 | 2/2013 |
| KR | 1020130103586 A | 9/2013 |
| KR | 1020140026216 A | 3/2014 |

* cited by examiner

OPTICAL TRANSCEIVER USING FEC, OPTICAL TRANSCEIVING SYSTEM COMPRISING SAME, AND REMOTE OPTICAL WAVELENGTH CONTROL METHOD

CROSS-REFERENCE TO RELATED APPLICATIONS

The present application is a U.S. National Phase of International Patent Application Serial No. PCT/KR2015/013590, entitled "OPTICAL TRANSCEIVER USING FEC, OPTICAL TRANSCEIVING SYSTEM COMPRISING SAME, AND REMOTE OPTICAL WAVELENGTH CONTROL METHOD," filed on Dec. 11, 2015. International Patent Application Serial No. PCT/KR2015/013590 claims priority to Korean Patent Application No. 10-2014-0179129, filed on Dec. 12, 2014. The entire contents of each of the above-cited applications are hereby incorporated by reference in their entirety for all purposes.

TECHNICAL FIELD

The present invention relates to an optical transceiver using an FEC, an optical transceiving system including the same, and a remote optical wavelength control method, and more particularly, to an optical transceiver using an FEC, an optical transceiving system including the same, and a remote optical wavelength control method capable of controlling and monitoring a subscriber-side optical transceiver by transceiving various control data to overhead (OH) excess bits of a forward error correction (FEC) data frame and stabilizing an optical wavelength and easily controlling optical wavelength setting values for each channel by controlling thermo-electric cooler (TEC) setting values using a look-up table (LUT) for each preset wavelength.

BACKGROUND ART

An optical transceiver is a communication module that performs optical-electric conversion and electric-optical conversion in an optical communication device. As a speed of an optical communication device increases, an optical transmission speed of the optical transceiver increases to 10 Gb/s or more and a size of the module is getting smaller.

In order to increase data transmission efficiency through an optical line, there are a method of transmitting data at high speed in a time domain and a method of transmitting data by dividing a wavelength into several wavelengths in a wavelength region.

The wavelength division multiplexing (WDM) optical communication network uses a wavelength variable optical transceiver to transmit data to be transmitted through different divided wavelengths. At this point, the wavelength variable optical transceiver used uses a wavelength locker installed therein to make a wavelength of an output optical signal constant.

Because the wavelength variable optical transceiver uses a wavelength locker to accurately adjust the wavelength to a wavelength that can be received at a remote location, a fabrication process of the wavelength variable optical transceiver equipped with the wavelength locker is complicated and therefore the wavelength variable optical transceiver is typically expensive. Therefore, the expensive wavelength variable optical transceiver is difficult to apply to in the places where a cheap wavelength variable optical transceiver is required, such as a subscriber network.

Accordingly, the optical transceiver using an FEC of the present invention may easily select, lock, and stabilize a wavelength without using a separate wavelength locker.

Meanwhile, the Korean Patent No. 10-1230590 ("Wavelength Variable Optical Transceiver", hereinafter, referred to as related art 1) discloses a wavelength variable optical transceiver that does not rely on a method for allocating wavelengths locked to remote nodes to subscriber terminals but may input various wavelengths to subscriber terminals and selectively transmit and receive the desired wavelength to provide convenience of maintenance/operation of a WDM optical communication network.

RELATED ART DOCUMENT

Patent Document

Korean Patent No. 10-1230590 (Registered Date: Jan. 31, 2013)

DISCLOSURE

Technical Problem

An object of the present invention is to provide an optical transceiver using an FEC, an optical transceiving system including the same, and a remote optical wavelength control method capable of controlling and monitoring a subscriber-side optical transceiver by transceiving various control data to overhead (OH) excess bits of a forward error correction (FEC) data frame and stabilizing an optical wavelength and easily controlling optical wavelength setting values for each channel by controlling thermo-electric cooler (TEC) setting values using look-up tables (LUT) for each preset wavelength.

Technical Solution

In one general aspect, an optical transceiver using FEC includes: an laser diode driver (LDD) 10 driving a laser diode (LD) that outputs light; a transmitter optical sub-assembly (TOSA) 20 transmitting an optical signal received from the LD driver 10; a receiver optical sub-assembly 30 receiving the optical signal from the transmitter optical sub-assembly 20; a micro controller unit 40 controlling the transmitter optical sub-assembly 20 and the receiver optical sub-assembly 30 and analyzing the optical signal; and a forward error correction (FEC) 50 controlled by the micro controller unit 40 and generating the optical signal, including control or monitoring request information on a subscriber-side base station in an overhead excess data frame.

If a central office-side optical transceiver processes a digital signal, the optical transceiver using an FEC may transmit state request information or state control information on a subscriber-side optical transceiver to an RU by including the state request information or the state control information in the overhead excess frame of the FEC 50 under a control of the micro controller unit 40.

If a subscriber-side optical transceiver processes a radio signal, the micro controller unit 40 may analyze information included in the received overhead excess data frame of the FEC 50 to transmit response information thereto to the central office-side optical transceiver by including the response information in the overhead excess data frame of the FEC 50.

In another general aspect, an optical transceiving system including an optical transceiver using FEC that includes an LD driver, a transmitter optical sub-assembly, a receiver optical sub-assembly, a micro controller unit, and an FEC, includes: a central office-side system 100 processing a digital signal of a central office-side base station using inter-integrated circuit (I2C) communication, transmitting state request information or state control information on a subscriber-side optical transceiver by including the state request information or the state control information in an overhead excess bit of a forward error correction (FEC) data frame under a control of the micro controller unit and monitoring the state information on the received subscriber-side optical transceiver; and a subscriber-side system 200 processing a radio signal of a subscriber-side base station using the I2C communication and transmitting current state information on the subscriber-side optical transceiver by including the current state information in the overhead excess bit of the FEC data frame by state request information on the subscriber-side optical transceiver received from the central office-side system 100 under the control of the micro controller unit or controlling the current state of the subscriber-side optical transceiver according to the state control information.

The subscriber-side system may use a look-up table (LUT) for each preset wavelength to perform an optical wavelength conversion of the subscriber-side optical transceiver when the central office-side system 100 transmits wavelength control information by including the wavelength control information in the overhead excess bit of the FEC data frame.

In another general aspect, a remote optical wavelength control method of an optical transceiving system including an optical transceiver using FEC that includes an LD driver, a transmitter optical sub-assembly, a receiver optical sub-assembly, a micro controller unit, and an FEC, the method includes: a first step (S100) of receiving, by an optical transceiver using a central office-side FEC, information for control or monitoring according to an outside request; a second step (S200) of including the information for control or monitoring in an overhead excess bit of a forward error correction (FEC) data frame, under a control of a micro controller unit of the optical transceiver using the central office-side FEC; a third step (S300) of transmitting the information for control or monitoring to an optical transceiver using a subscriber-side FEC, together with an optical signal received from the LD driver in a transmitter optical sub-assembly (TOSA) of the optical transceiver using the central office-side FEC; a fourth step (S400) of receiving, by the receiver optical sub-assembly (ROSA) of the optical transceiver using the subscriber-side FEC, the optical signal; a fifth step (S500) of analyzing, by the micro controller unit of the optical transceiver using the subscriber-side FEC, the information for control or monitoring included in the overhead excess bit of the FEC data frame; and a sixth step (S600) of transmitting, by the micro controller unit of the optical transceiver using the subscriber-side FEC, information corresponding to the information for control or monitoring by including the corresponding information in the overhead excess bit of the FEC data frame to the optical transceiver using the central office-side FEC.

As the analysis result of the information for control or monitoring in fifth step (S500), when the information is the information for control, the micro controller unit of the optical transceiver using the subscriber-side FEC may perform a control and then the result information may be transmitted by being included in the corresponding information and when the information is the information for monitoring, the micro controller unit of the optical transceiver using the subscriber-side FEC may transmit current state information on the optical transceiver using the subscriber-side FEC by including the current state information in the corresponding information.

When the information is the information for wavelength control, the micro controller unit of the optical transceiver using the subscriber-side FEC may use a look-up table (LUT) for each preset wavelength to perform an optical wavelength conversion.

Advantageous Effects

The optical transceiver using an FEC, the optical transceiving system including the same, and the remote optical wavelength control method according to the present invention may control and monitor the subscriber-side optical transceiver by transceiving various control data to the overhead (OH) excess bits of the forward error correction (FEC) data frame and easily stabilize the optical wavelength and control the optical wavelength setting values for each channel by controlling the thermo-electric cooler (TEC) setting values using the look-up tables (LUT) for each preset wavelength.

In particular, when the optical transceiver using an FEC of the present invention is fabricated as the wavelength variable optical transceiver, the wavelength variable optical transceiver may be manufactured cheaply by easily controlling the optical wavelength setting values, without the wavelength locker that makes it complicated to manufacture the wavelength variable optical transceiver to increases the manufacturing cost.

In addition, it is possible to minimize the packet loss on the network and rapidly perform the remote control and monitoring by transmitting the various control information using the overhead excess bits of the FEC data frame and receiving the response information thereto.

In other words, it is possible to check the subscriber-side optical transceiver information without the separate equipment and intelligently and efficiently operate the system by controlling the optical wavelength setting values for each channel of the optical transceiver in the optical transceiving system.

BEST MODE

Figure 1:
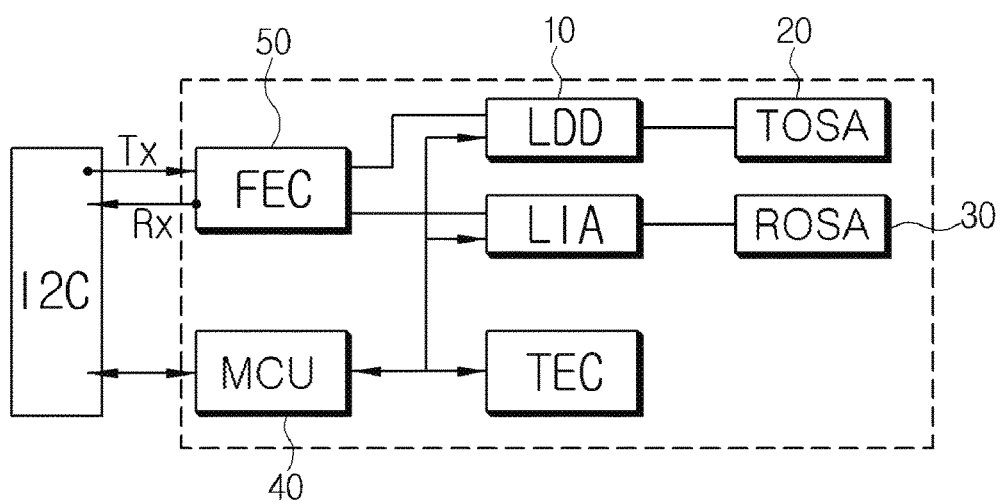
FIG. 1 is a configuration diagram schematically illustrating an optical transceiver using an FEC according to an exemplary embodiment of the present invention.

Hereinafter, an optical transceiver using an FEC, an optical transceiving system including the same, and a remote optical wavelength control method will be described in detail with reference to the accompanying drawings. The exemplary embodiments of the present invention to be introduced below are provided by way of example so that the idea of the present invention can be sufficiently transferred to those skilled in the art to which the present invention pertains. Accordingly, the scope of the present invention is not restricted to the following description and accompanying drawings and may be embodied in another form. In addition, throughout the specification, like reference numerals denotes like components.

Here, unless indicated otherwise, the terms used in the specification including technical and scientific terms have the same meaning as those that are usually understood by those who skilled in the art to which the present invention pertains, and detailed description of the known functions and constitutions that may obscure the gist of the present invention will be omitted.

In addition, the system means a set of components including apparatuses, mechanisms, units, etc. which are organized and regularly interact with each other to perform required functions.

The present invention relates to an optical transceiver using an FEC, an optical transceiving system including an optical transceiver using an FEC, and a remote optical wavelength control method using the optical transceiving system and may perform remote control and monitoring of an optical transceiver using a subscriber-side FEC at an optical transceiver using a central office-side FEC and remotely control and stabilize the optical wavelength by controlling the optical wavelength setting value when the optical transceiver using an FEC is applied as a wavelength variable optical transceiver.

In addition, as an optical transceiver using an FEC, an optical transceiving system including the optical transceiver using an FEC, and an optical communication network for performing a remote optical wavelength control method using the same according to the present invention are performed, a passive optical network (PON), a dense wavelength division multiplexing (DWDM) network, a common public radio interface (CPRI) network, a coarse WDM (CWDM) network, or the like may be variously applied to remotely control and monitor the subscriber-side optical transceiver and control the optical wavelength setting.

The optical transceiver using an FEC may control and monitor an optical transceiver using subscriber-side FEC (hereinafter, referred to as 'subscriber side') by transceiving various control data to overhead (OH) excess bits of a forward error correction (FEC) data frame of an optical transceiver using a central office-side FEC (hereinafter, referred to as 'central office side') and easily stabilize an optical wavelength and control optical wavelength setting values for each channel by controlling thermo-electric cooler (TEC) setting values using a look-up table (LUT) for each preset wavelength in a micro controller unit (MCU) of the subscriber side when applied as a wavelength variable optical transceiver.

The optical transceiver using an FEC, the optical transceiving system including the optical transceiver using an FEC, and the remote optical wavelength control method using the optical transceiving system may be configured to perform remote control and remote monitoring between the central office side and the subscriber side in the optical communication network.

FIG. 1 is a configuration diagram illustrating an optical transceiver using an FEC according to an exemplary embodiment of the present invention. The optical transceiver using an FEC according to the exemplary embodiment of the present invention will be described in detail with reference to FIG. 1.

As illustrated in FIG. 1, the optical transceiver using an FEC according to the exemplary embodiment of the present invention includes a laser diode driver (LDD) 10, a transmitter optical sub-assembly (TOSA) 20, a receiver optical sub-assembly (ROSA) 30, a micro controller unit (MCU) 40, and a forward error correction (FEC) 50, a limiting amplifier (LIA), and a thermo-electric cooler (TEC).

As described above, the optical transceiver using an FEC according to the exemplary embodiment of the present invention is made up of a central office-side optical transceiver or a subscriber-side optical transceiver to remotely control and monitor the subscriber side in the optical communication network.

In addition, although the optical transceiver using an FEC of the present invention in FIG. 1 includes the FEC 50 installed therein, this is merely an exemplary embodiment of the present invention. Therefore, the FEC 50 may be installed inside or outside the optical transceiver.

In other words, the optical transceiver using an FEC according to the exemplary embodiment of the present invention is an optical transceiver of an XFP (10 Gb/s small from-factor pluggable) and is an optical transceiver that is connected to a micro controller unit and an external inter-integrated circuit (I2C) communication interface to transmit and receive control request information and state monitoring request information to and from a network.

Each component will be described below in detail.

The LD driver 10 drives a laser diode (LD) for outputting light.

The transmitter optical sub-assembly 20 transmits an optical signal transmitted from the LD driver 10. That is, the transmitter optical sub-assembly 20 is used to transmit an optical signal from a central office side to a subscriber side and from the subscriber side to the central office side.

The receiver optical sub-assembly 30 receives the optical signal from the transmitter optical sub-assembly 20. In other words, when the subscriber-side transmitter optical sub-assembly transmits the optical signal, the central office-side receiver optical sub-assembly 30 receives the optical signal and when the central office-side transmitter optical sub-assembly 20 transmits the optical signal, the subscriber-side receiver optical sub-assembly 30 receives the optical signal.

The micro controller unit 40 controls the transmitter optical sub-assembly 20 and the receiver optical sub-assembly 30 and analyzes the received optical signal or controls the optical signal to be transmitted.

The FEC 50 is controlled by the micro controller unit 40 and generates an optical signal in an overhead excess data frame, including control request information or monitoring request information for a subscriber.

Accordingly, when the optical transceiver using an FEC according to the exemplary embodiment of the present invention transmits the control request information or the monitoring request information to the overhead excess data frame of the central office-side FEC 50 by including the control request information or the monitoring request information in the optical signal, the subscriber-side micro controller unit analyzes the information included in the overhead excess data frame of the central office-side FEC 50 to control the optical transceiver using the subscriber-side FEC and transmits response information corresponding to the request information to the overhead excess data frame of the subscriber-side FEC 50 by including the response information in the optical signal, such that the central office side may remotely control and monitor the subscriber side.

When the central office-optical transceiver processes a digital signal, the optical transceiver using an FEC according to the exemplary embodiment of the present invention transmits the optical signal to the subscriber side, including the state request information (monitoring request information) or the state control information (control request information) on the subscriber side in the overhead excess data frame of the FEC 50 under the control of the micro controller unit 40.

On the other hand, when the subscriber side optical transceiver processes a radio signal, the micro controller unit 40 analyzes the information included in the received overhead excess data frame of the central office side FEC 50 to transmit the optical signal to the central office side by including the corresponding response information in the overhead excess data frame of the FEC 50.

At this point, when the state request information for simply monitoring the current state of the subscriber-side optical transceiver or the state control information for the simple control is transmitted or received or is applied to the wavelength variable optical transceiver, the information for the optical wavelength control may also be transmitted and received.

In other words, the subscriber side may request and monitor the transmitting and receiving state of the optical transceiver located at the central office side, a serial number, input power monitoring (IPM) that is an optical input value, output power monitoring (OPM) that is an optical output value, a temperature value (Temp) of a module, Vcc that is a power supply, a present current value IBais, and a set optical wavelength value or may additionally control an optical wavelength setting value.

Here, a transmitting and receiving method for an optical wavelength control will be again described in the following remote optical wavelength control method.

Figure 2:
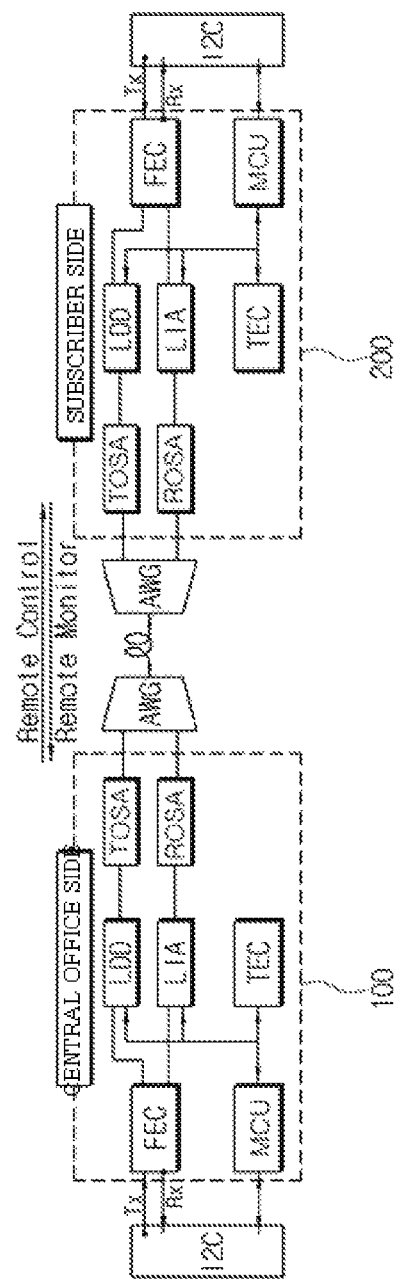
FIG. 2 is a configuration diagram schematically illustrating an optical transceiving system including an optical transceiver using an FEC according to an exemplary embodiment of the present invention.

FIG. 2 is a configuration diagram illustrating an optical transceiving system including an optical transceiver using an FEC according to an exemplary embodiment of the present invention. An optical transceiving system including the optical transceiver using an FEC according to the exemplary embodiment of the present invention will be described in detail with reference to FIG. 2.

As illustrated in FIG. 2, the optical transceiving system including the optical transceiver using an FEC according to the exemplary embodiment of the present invention may be configured to include a central office-side system 100 and a subscriber-side system.

The central office-side system 100 and the subscriber-side system 200 are made up of the optical transceiver using an FEC that includes the LD driver 10, the transmitter optical sub-assembly 20, the receiver optical sub-assembly 30, the micro controller unit 40, and the FEC 50 and may perform the remote control and monitoring.

Each component will be described below in detail.

The central office-side system 100 refers to a base station that processes a digital signal using inter-integrated circuit (I2C) communication.

The central office-side system 100 transmits the state request information or the state control information on the optical transceiver using an FEC included in the subscriber-side system 200 by including the state request information or the state control information in the overhead excess bits of the FEC 50 data frame, under the control of the micro controller unit 40.

The central office-side system 100 may remotely monitor the received state information on the optical transceiver using an FEC included in the subscriber-side system 200 according to the state request information or the state control information.

The subscriber-side system 200 refers to a base station that processes a radio signal using I2C communication, like the central office-side system 100.

The subscriber-side system 200 may perform the optical transmission on the current state information on the optical transceiver using an FEC included in the subscriber system 200 by including the current state information in the overhead excess bits of the FEC 50 data frame, according to the state request information received from the central office-side system 100 or control the current state of the optical transceiver using an FEC included in the subscriber-side system 200 and perform the optical transmission by including the response information thereto in the overhead excess bits of the FEC 50 data frame.

In addition, the optical transceiver system including the optical transceiver using an FEC according to the exemplary embodiment of the present invention may transmit and receive the wavelength conversion information, not the simple state request information or the simple state control information on the optical transceiver using an FEC included in the subscriber-side system 200.

That is, when the optical transceiver using an FEC of the central office-side system 100 transmits the wavelength control information to the subscriber-side system 200 by including the wavelength control information in the overhead excess bits of the FEC 50 data frame, the subscriber-side system 200 may control the wavelength conversion of the optical transceiver, that is, the optical wavelength setting value using the look-up table (LUT) for each preset wavelength preset in the micro controller unit 40 of the optical transceiver using an FEC included in the subscriber-side system 200.

A remote optical wavelength control method of an optical transceiving system including an optical transceiver using an FEC according to an exemplary embodiment of the present invention will be described.

Figure 3:
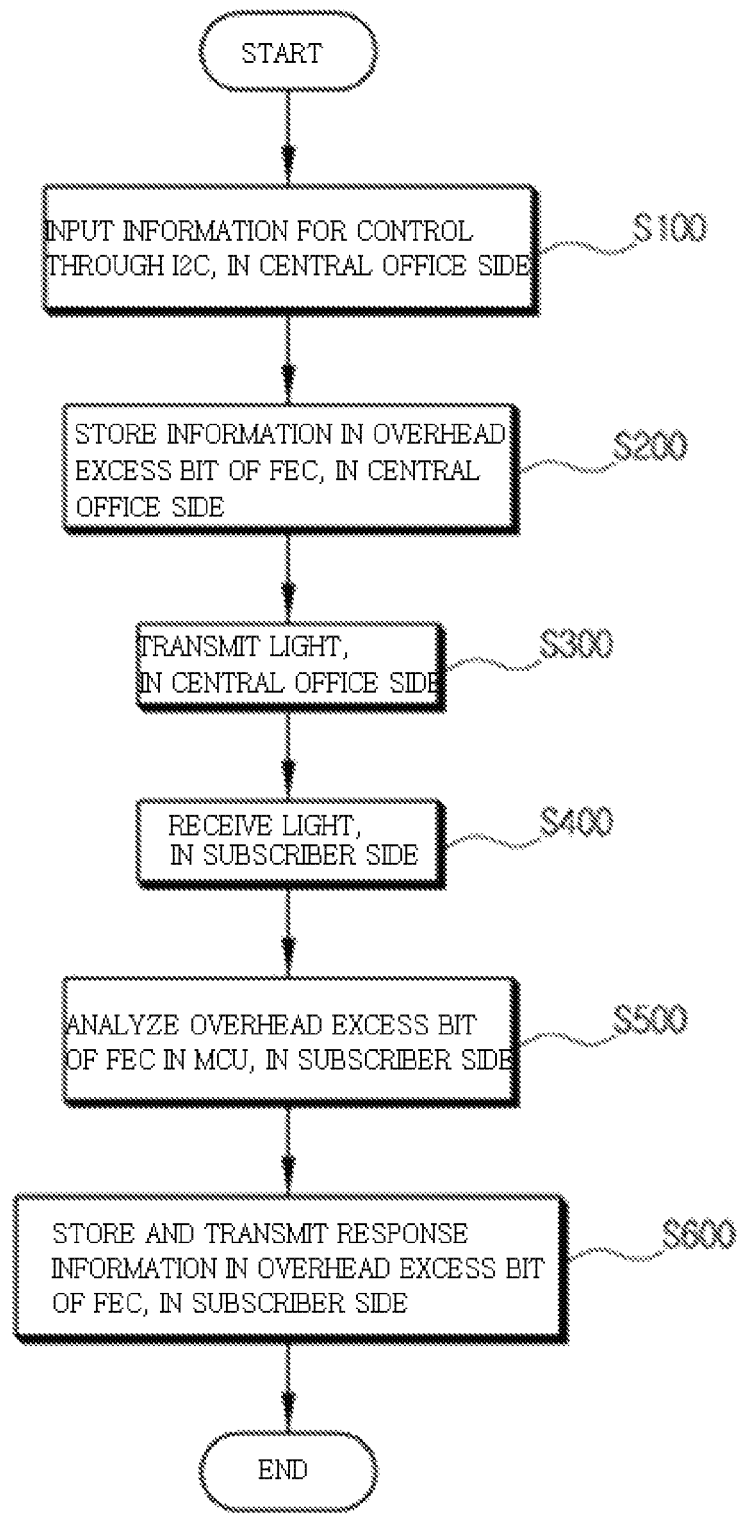
FIG. 3 is a flowchart illustrating a remote optical wavelength control method of an optical transceiving system including an optical transceiver using an FEC according to an exemplary embodiment of the present invention.
Figure 4:
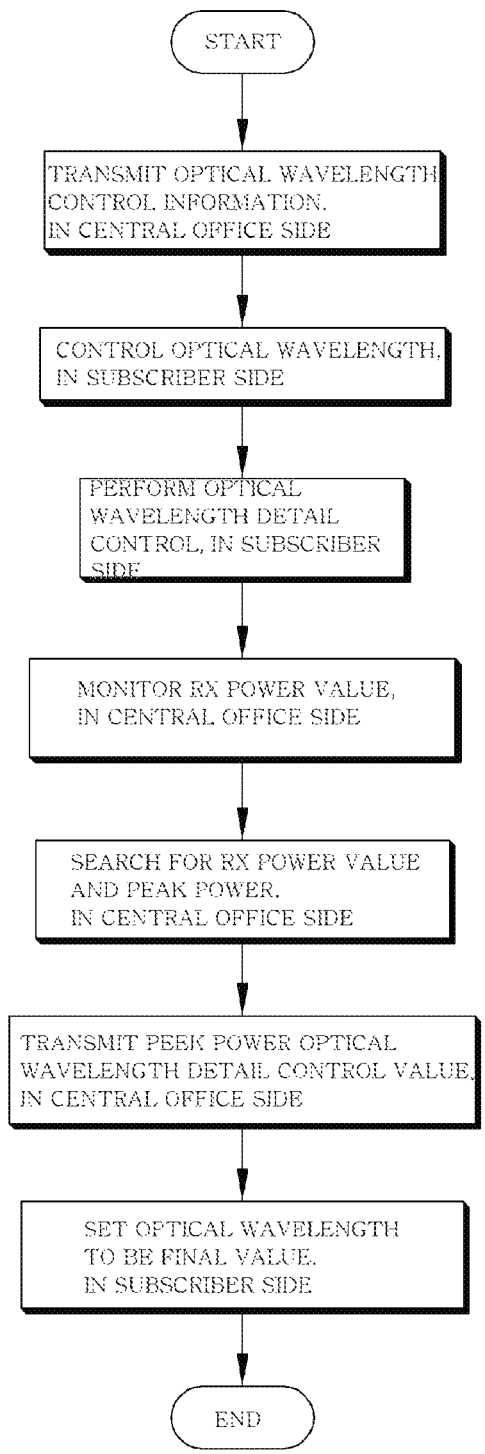
FIG. 4 is a flowchart illustrating a remote optical wavelength control method of an optical transceiving system including an optical transceiver using an FEC according to another exemplary embodiment of the present invention.

FIGS. 3 and 4 are flowcharts illustrating a remote optical wavelength control method of an optical transceiving system including an optical transceiver using an FEC according to an exemplary embodiment of the present invention. The remote optical wavelength control method of an optical transceiving system including an optical transceiver using an FEC according to the exemplary embodiment of the present invention will be described with reference to FIGS. 3 and 4.

As illustrated in FIG. 3, the remote optical wavelength control method of an optical transceiving system including an optical transceiver using an FEC according to the exemplary embodiment of the present invention may include first to sixth steps (S100 to S600).

Briefly, a manager of the central office-side system 100 selects the optical wavelength information to be changed and transmits the wavelength information to the optical transceiver using an FEC of the central office-side system 100 through the I2C communication and the optical transceiver using an FEC of the central office-side system 100 transmits the wavelength information to the FEC to store the wavelength information in the excess bits of the FEC overhead data frame, under the control of the micro controller unit.

Thereafter, the wavelength information is transmitted to the RU system 200 through the transmitter optical sub-assembly.

The optical transceiver using an FEC of the subscriber-side system 200 uses the micro controller unit to analyze the information stored in the excess bits of the overhead data frame of the FEC received through the receiver optical sub-assembly and uses the look-up table (LUT) for each optical wavelength prestored (configured) to convert the optical wavelength and then tune in detail the wavelength, thereby clearly performing the optical wavelength setting value conversion.

Each step will be described below in detail.

In the first step S100, in the optical transceiver using an FEC of the central office-side system 100 receives the information for control or monitoring of the subscriber-side system 200 according to the outside (manager, operator) request.

At this time, the information for the control or monitoring is transmitted to the optical transceiver using an FEC of the central office-side system 100 through the I2C communication.

In the second step S200, the optical transceiver using an FEC of the central office-side system 100 includes the information for control or monitoring received in the first step (S100) in the overhead excess bits of the FEC 50 data frame, under the control of the micro controller unit 40.

By doing so, the excess bits of the FEC 50 may be efficiently utilized without using separate additional means or optical channels.

In the third step S300, in the optical transceiver using an FEC of the central office-side system 100, the optical transmission of the overhead excess bits of the FEC 50 data frame including the information for control or monitoring together with the optical signal received from the LD driver 10 in the transmitter optical sub-assembly 20 to the optical transceiver using an FEC of the subscriber-side system 200 is performed.

In the fourth step S400, in the optical transceiver using an FEC of the subscriber-side system 200, the receiver optical sub-assembly 30 receives the optical signal transmitted from the optical transceiver using an FEC of the central office-side system.

In the fifth step S500, the optical transceiver using an FEC of the subscriber-side system 200 analyzes the received optical signal.

That is, the micro controller unit 40 of the optical transceiver using an FEC of the subscriber-side system 200 analyzes the information for control or monitoring included in the overhead excess bits of the FEC 50 data frame of the optical signal received.

In the sixth step S600, in the optical transceiver using an FEC of the subscriber-side system 200, the micro controller unit 40 controls the optical transceiver using an FEC of the subscriber-side system 200 according to the information analyzed in the fifth step (S500).

After the control is performed in the sixth step S600, the corresponding information is transmitted to the wavelength variable transceiver using the FEC of the central office-side system 100 by being included in the overhead excess bits of the FEC 50 data frame of the optical transceiver using an FEC of the subscriber-side system 200, thereby easily performing the control and monitoring.

In detail, in the sixth step S600, the micro controller unit 40 of the optical transceiver using an FEC of the subscriber-side system 200 may perform the control in the case of the information for control as the information analysis result for the control or monitoring in the fifth step S500 and then transmit the result information by including the result information in the corresponding information, and the micro controller unit 40 of the optical transceiver using an FEC of the subscriber-side system 200 may transmit the current state information on the optical transceiver using an FEC of the subscriber-side system 200 by including the current state information in the corresponding information in the case of the information for monitoring.

At this time, the remote control data of the used LUT is shown in Table 1 below, and the remote monitoring data of the LUT is shown in the following Table 2.

TABLE 1

Remote Control Data

| Add | INDEX | Comment | INT | W/R |
|---|---|---|---|---|
| 0 | Channel_ID | Control data | INT | W/R |
| 1 | Locking State | | INT | |
| 2 | Bias_offset(Power) | | INT | |
| 3 | | | INT | |
| 4 | Mod_offset(Modulation) | | INT | |
| 5 | | | INT | |
| 6 | TEC_Set_Offset | | INT | |
| 7 | | | INT | |
| 8 | Heater_set_Offset | | INT | |
| 9 | | | INT | |
| 10 | Phase_set_Offset | | INT | |
| 11 | | | INT | |
| 12 | LOS Level | | INT | |
| 13 | Reserve | | INT | |
| 14 | fine tuning start | | INT | |
| 15 | fine tuning stop | | INT | |
| ~ | Reserve | | | |
| 127 | INTERRUPT | | INT | |

TABLE 2

Remote Monitoring Data

| Add | INDEX | Comment | INT | W/R |
|---|---|---|---|---|
| 128 | Temp_Monitor | Remote location | Non | R |
| 129 | Temp_Monitor | DDM | | |
| 130 | Reserve | information | | |
| 131 | Reserve | | | |
| 132 | Bias_Mon | | | |
| 133 | Bias_Mon | | | |
| 134 | TxPower_Mon | | | |
| 135 | TxPower_Mon | | | |
| 136 | RxPower_Mon | | | |
| 137 | RxPower_Mon | | | |
| 138 | Vcc_Mon | | | |
| 139 | Vcc_Mon | | | |
| 140 | LDTemp_Mon | | | |
| 141 | LDTemp_Mon | | | |
| 142 | Optional State and Control | | | |
| 143 | Reserve | | | |
| 144 | Alarm Flags | | | |
| 145 | Alarm Flags | | | |
| 146 | Reserve | | | |
| 147 | Reserve | | | |
| 148 | Warning Flags | | | |
| 149 | Warning Flags | | | |
| 150 | Ext State/Control | | | |
| 151 | Reserve | | | |
| 152 | Vendor-Serial Number | Vendor | | |
| 153 | Vendor-Serial Number | Serial Number | | |
| 154 | Vendor-Serial Number | | | |
| 155 | Vendor-Serial Number | | | |
| 156 | Vendor-Serial Number | | | |
| 157 | Vendor-Serial Number | | | |
| 158 | Vendor-Serial Number | | | |
| 159 | Vendor-Serial Number | | | |
| 160 | Vendor-Serial Number | | | |
| 161 | Vendor-Serial Number | | | |
| 162 | Vendor-Serial Number | | | |
| 163 | Vendor-Serial Number | | | |

TABLE 2-continued

Remote Monitoring Data

| Add | INDEX | Comment | INT | W/R |
|---|---|---|---|---|
| 164 | Vendor-Serial Number | | | |
| 165 | Vendor-Serial Number | | | |
| 166 | Vendor-Serial Number | | | |
| 167 | Vendor-Serial Number | | | |

In addition, as illustrated in FIG. 4, the remote optical wavelength control method of the optical transceiving system including an optical transceiver using an FEC according to an exemplary embodiment of the present invention may transmit and receive information for wavelength control.

In other words, when the optical transceiver using an FEC of the present invention is applied as a wavelength variable optical transceiver, the optical transceiver may transmit and receive the information for wavelength control to control the optical wavelength setting value of the optical transceiver using an FEC included in the subscriber-side system 200 and perform the optical wavelength stabilization.

In more detail, in sixth step (S600), if it is determined as the analysis of the fifth step (500) that the information for control or monitoring is the information for wavelength control, the micro controller unit 40 of the optical transceiver using an FEC of the subscriber-side system 200 may use the look-up table (LUT) for each preset wavelength to perform the wavelength conversion.

In more detail, as illustrated in FIG. 4, the optical transceiver using an FEC of the central office-side system 100 transmits the optical wavelength control information included in the overhead excess bit of the FEC to the subscriber-side system 200.

Thereafter, the micro controller unit 40 of the optical transceiver using an FEC of the subscriber-side system 200 uses the LUT for each preset wavelength to primarily perform the wavelength control.

Thereafter, the micro controller unit 40 of the optical transceiver using an FEC of the subscriber-side system 200 performs an optical wavelength detail control (start fine tuning control).

At this time, the micro controller unit 40 of the optical transceiver using an FEC of the subscriber-side system 200 performs the optical wavelength detail control in units of 4 seconds for about 60 seconds.

Thereafter, the optical transceiver using an FEC of the central office-side system 100 searches for peek power of the Rx power value for about 60 seconds while monitoring the Rx power value in real time.

Accordingly, the optical transceiver using an FEC of the central office-side system 100 may control the optical wavelength setting value to be set as the final value by transmitting the optical wavelength detail setting value at the peek power to the subscriber-side system 200.

In other words, the optical transceiver using an FEC of the present invention, the optical transceiving system including the optical transceiver using an FEC, and the remote optical wavelength control method using the optical transceiving system may be configured to include a transmission module that may transmit the control data such as FEC to the inside or the outside of the optical transceiver to perform optical communication by including the remote control information or the remote monitoring information in the overheat excess bits of the FEC data frame, thereby preventing the waste of the transmission channel bandwidth.

Further, it is possible to easily monitor the optical transmitting and receiving channel control at a remote location as well as the simple control, the optical wavelength stabilization function, and the state of the optical receiver at a remote location.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

DETAILED DESCRIPTION OF MAIN ELEMENTS

10: Laser diode driver (LDD)
20: Transmitter optical sub-assembly (TOSA)
30: Receiver optical sub-assembly (ROSA)
40: Micro controller unit (MCU)
50: Forward error correction (FEC)
100: Central office-side system
200: Subscriber-side system

The invention claimed is:

1. An optical transceiving system including a subscriber-side optical transceiver, the subscriber-side optical transceiver including an LD driver, a transmitter optical sub-assembly, a receiver optical sub-assembly, a micro controller unit, and a forward error correction (FEC), the optical transceiving system comprising:

a central office-side system processing a digital signal of a central office-side base station using inter-integrated circuit (I2C) communication, transmitting state request information or state control information on the subscriber-side optical transceiver by including the state request information or the state control information in an overhead excess bit of an FEC data frame under a control of the micro controller unit and monitoring the state information on the received subscriber-side optical transceiver; and a subscriber-side system processing a radio signal of a subscriber-side base station using the I2C communication and transmitting current state information on the subscriber-side optical transceiver by including the current state information in the overhead excess bit of the FEC data frame by the state request information on the subscriber-side optical transceiver received from the central office-side system under the control of the micro controller unit or controlling the current state of the subscriber-side optical transceiver according to the state control information, wherein the subscriber-side system uses a look-up table (LUT) for each preset wavelength to perform an optical wavelength conversion of the subscriber-side optical transceiver when the central office-side system transmits wavelength control information by including the wavelength control information in the overhead excess bit of the FEC data frame.

2. A remote optical wavelength control method of an optical transceiving system including a first optical transceiver and a second optical transceiver, each of the first optical transceiver and the second optical transceiver including using an FEC that includes a respective LD driver, a respective transmitter optical sub-assembly, a respective receiver optical sub-assembly, a respective micro controller unit, and a respective forward error correction (FEC), the method comprising:
- a first step of receiving, by the first optical transceiver using a central office-side FEC, information for control or monitoring according to an outside request;
- a second step of including the information for control or monitoring in an overhead excess bit of an FEC data frame, under a control of a micro controller unit of the first optical transceiver using the central office-side FEC;
- a third step of transmitting the information for control or monitoring to the second optical transceiver using a subscriber-side FEC, together with an optical signal received from the LD driver in a transmitter optical sub-assembly (TOSA) of the first optical transceiver using the central office-side FEC;
- a fourth step of receiving, by a receiver optical sub-assembly (ROSA) of the second optical transceiver using the subscriber-side FEC, the optical signal;
- a fifth step of analyzing, by a micro controller unit of the second optical transceiver using the subscriber-side FEC, the information for control or monitoring included in the overhead excess bit of the FEC data frame; and
- a sixth step of transmitting, by the micro controller unit of the second optical transceiver using the subscriber-side FEC, information corresponding to the information for control or monitoring to the first optical transceiver using the central office-side FEC by including the corresponding information in the overhead excess bit of the FEC data frame, wherein, as an analysis result of the information for control or monitoring in the fifth step, when the information is information for wavelength control, the micro controller unit of the second optical transceiver using the subscriber-side FEC uses a look-up table (LUT) for each preset wavelength to perform an optical wavelength conversion.

3. The remote optical wavelength control method of claim 2, wherein as the analysis result of the information for control or monitoring in fifth step, when the information is the information for control, the micro controller unit of the second optical transceiver using the subscriber-side FEC performs a control and then the result information is transmitted by being included in the corresponding information and when the information is the information for monitoring, the micro controller unit of the second optical transceiver using the subscriber-side FEC transmits current state information on the second optical transceiver using the subscriber-side FEC by including the current state information in the corresponding information.

* * * * *